(12) United States Patent
Yokota et al.

(10) Patent No.: US 11,292,451 B2
(45) Date of Patent: Apr. 5, 2022

(54) CONTROL SYSTEM FOR HYBRID VEHICLE OPERABLE IN DIFFERENT MODES

(71) Applicant: TOYOTA JIDOSHA KABUSHIKI KAISHA, Toyota (JP)

(72) Inventors: Atsuhiko Yokota, Gotemba (JP); Hideo Watanabe, Toyota (JP); Kazumi Hoshiya, Gotemba (JP); Satoshi Yamanaka, Gotemba (JP); Jonggap Kim, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 16/176,252

(22) Filed: Oct. 31, 2018

(65) Prior Publication Data

US 2019/0126908 A1    May 2, 2019

(30) Foreign Application Priority Data

Oct. 31, 2017 (JP) .............................. JP2017-210067

(51) Int. Cl.
*B60W 20/20* (2016.01)
*B60W 20/19* (2016.01)
(Continued)

(52) U.S. Cl.
CPC ............ *B60W 20/19* (2016.01); *B60K 6/387* (2013.01); *B60K 6/442* (2013.01); *B60W 10/02* (2013.01);
(Continued)

(58) Field of Classification Search
CPC ...... B60W 20/19; B60W 10/06; B60W 10/08; B60W 10/02; B60W 20/20;
(Continued)

(56) References Cited

U.S. PATENT DOCUMENTS 6,083,138 A * 7/2000 Aoyama ................ B60K 6/543
477/5
10,065,633 B2 * 9/2018 Banshoya .............. B60K 6/547
(Continued)

FOREIGN PATENT DOCUMENTS

WO      2012/059996 A1    5/2012
WO   WO-2016020195 A1 *  2/2016 ............ B60W 30/18

OTHER PUBLICATIONS

Margaret J. Yatsko, "Acceleration Mode Development for Parallel-Series Hybrid Electric Vehicle" (Ohio State University, 2014). (Year: 2014).*

(Continued)

*Primary Examiner* — Donald J Wallace
*Assistant Examiner* — Daniel M. Robert
(74) *Attorney, Agent, or Firm* — Oliff PLC

(57) ABSTRACT

A hybrid vehicle in which a running mode can be appropriately shifted without making a driver feel uncomfortable or feel a sense of slowness. A hybrid vehicle includes an engine, a first motor, a second motor, and a clutch that selectively transmits power between the engine and drive wheels. A controller shifts a running mode to the parallel hybrid vehicle mode in a case of accelerating the hybrid vehicle in the electric vehicle mode, if the drive force is greater than a maximum drive force generatable in the electric vehicle mode, and also greater than a required additional drive force as a variable corresponding to a running resistance against the hybrid vehicle running on a predetermined running road at a predetermined vehicle speed by a predetermined drive force that is set in advance based on the vehicle speed and the drive force.

12 Claims, 7 Drawing Sheets

(51) Int. Cl.
*B60K 6/387* (2007.10)
*B60W 10/06* (2006.01)
*B60W 10/08* (2006.01)
*B60W 10/02* (2006.01)
*B60K 6/442* (2007.10)

(52) U.S. Cl.
CPC ............ *B60W 10/06* (2013.01); *B60W 10/08* (2013.01); *B60W 20/20* (2013.01); *B60W 2540/10* (2013.01); *B60W 2710/021* (2013.01); *B60W 2710/0666* (2013.01); *B60W 2710/08* (2013.01); *B60Y 2200/92* (2013.01)

(58) Field of Classification Search
CPC ....... B60W 2540/10; B60W 2710/021; B60W 2710/0666; B60W 2710/08; B60W 2520/10; B60K 6/387; B60K 6/442; B60K 2006/4808; B60K 2006/4825; B60Y 2200/92; Y02T 10/72; Y02T 10/62
See application file for complete search history.

(56) References Cited

U.S. PATENT DOCUMENTS

| | | | | |
|---|---|---|---|---|
| 2001/0039230 | A1* | 11/2001 | Severinsky | B60K 1/02 477/3 |
| 2006/0224284 | A1* | 10/2006 | Ueno | G05G 5/03 701/36 |
| 2006/0247084 | A1* | 11/2006 | Suzuki | F16H 61/061 475/116 |
| 2007/0275808 | A1* | 11/2007 | Iwanaka | B60K 6/40 475/5 |
| 2008/0314658 | A1* | 12/2008 | Atarashi | B60W 10/06 180/65.25 |
| 2010/0030437 | A1* | 2/2010 | Kim | F16H 61/0213 701/65 |
| 2010/0035715 | A1* | 2/2010 | Ortmann | B60W 10/02 475/5 |
| 2012/0089284 | A1* | 4/2012 | Nissato | B60L 53/00 701/22 |
| 2012/0245783 | A1* | 9/2012 | Tamagawa | B60W 20/10 701/22 |
| 2013/0166118 | A1* | 6/2013 | Kim | B60W 10/06 701/22 |
| 2013/0218394 | A1 | 8/2013 | Kanayama et al. | |
| 2015/0203095 | A1* | 7/2015 | Il | B60K 6/442 701/22 |
| 2015/0314775 | A1* | 11/2015 | Dextreit | B60W 10/06 701/22 |
| 2015/0377346 | A1* | 12/2015 | Tsukizaki | B60W 10/10 701/51 |
| 2016/0114785 | A1* | 4/2016 | Kato | B60W 10/08 701/22 |
| 2017/0327104 | A1* | 11/2017 | Miller | B60W 20/15 |
| 2018/0079312 | A1* | 3/2018 | Herb | B60T 8/1755 |
| 2020/0164860 | A1* | 5/2020 | Morita | B60W 10/08 |

OTHER PUBLICATIONS

The U.S. Appl. No. 16/015,991, filed Jun. 22, 2018 in the name of Segawa et al.

* cited by examiner

CONTROL SYSTEM FOR HYBRID VEHICLE OPERABLE IN DIFFERENT MODES

CROSS REFERENCE TO RELATED APPLICATIONS

The present application claims the benefit of priority to Japanese Patent Application No. 2017-210067 filed on Oct. 31, 2017 with the Japanese Patent Office, the entire contents of which are incorporated herein by reference in its entirety.

BACKGROUND

Field of the Disclosure

Embodiments of the disclosure relate to the art of a hybrid vehicle in which a prime mover includes an engine and a motor having a power generation function.

Discussion of the Related Art

WO2012/059996 describes an invention related to a hybrid vehicle. The hybrid vehicle taught by WO2012/059996 includes a first motor, a clutch, and a second motor. The first motor is connected to an engine. The clutch provides a connection and disconnection in a power transmission path between drive wheels and each of the engine and the first motor. The second motor is connected to the drive wheels in a power transmittable manner. The hybrid vehicle can run in at least two modes including an electric vehicle (EV) running mode and a parallel hybrid vehicle (HV) running mode. The hybrid vehicle running in the EV running mode is powered by the second motor, with the clutch disengaged to disconnect the engine from the power transmission path. The hybrid vehicle running in the parallel HV running mode is powered by the engine and at least one of the first motor and the second motor, with the clutch engaged to connect the power transmission path to the engine. The EV running mode and the parallel HV running mode are switched from one to another in accordance with a predetermined mode switching condition. WO2012/059996 discloses a two-dimensional mode switching map using a required drive force and a vehicle speed as parameters as an example of the running mode switching condition. In the running mode switching map, an ES switching line defining a region (EV region) for running in the EV running mode and an SP switching line defining a region (parallel HV region) for running in the parallel HV running mode are set. Specifically, the EV region is on the lower required drive force/lower vehicle speed side relative to the ES switching line. The parallel HV region is on the higher required drive force/higher vehicle speed side relative to the SP switching line. A series HV region for running in a series HV running mode is defined between the ES switching line and the SP switching line. The hybrid vehicle running in the series HV running mode is powered by the second motor and has the first motor driven by an output from the engine to generate power, with the clutch disengaged to disconnect the engine from the power transmission path.

The hybrid vehicle described in WO2012/059996 has two shift modes (first and second shift modes) for shifting from the EV running mode to the parallel HV running mode. In the first shift mode, the engine is cranked by the first motor, and the clutch is engaged after the engine is ignited and started. In the second shift mode, the engine is cranked by the first motor, and the engine is ignited and started after the clutch is engaged. The first and the second shift modes are selectively switched from one to another in accordance with an intention, driving habits, and the like of the driver. For example, the EV running mode may be shifted to the parallel HV running mode generally in the first shift mode, and may be shifted to the parallel HV running mode in the second shift mode when the driver is determined or estimated to be desiring power-performance-oriented/high-responsiveness running.

For example, the running mode of the hybrid vehicle described in WO2012/059996 shifts to the parallel HV running mode when the required drive force increases over the SP switching line on the running mode switching map. The running mode shifts to the parallel HV running mode in the second shift mode when the driver is determined to be desiring power-performance-oriented running or high responsiveness for accelerator operations. Specifically, the running mode shifts to the parallel HV running mode with the engine ignited and started after the clutch is engaged to achieve high responsiveness. The clutch is engaged with synchronization control performed by using the first motor to facilitate the engagement of the clutch. In the second shift mode, the clutch is engaged before the engine initiates a combustion operation, and thus can be engaged with the synchronization control swiftly executed without being affected by engine torque. Thus, the running mode can be switched to the parallel HV running mode with a shorter period of time (mode switching time), whereby the responsiveness of the hybrid vehicle can be improved, according to WO2012/059996.

The hybrid vehicle described in WO2012/059996 still has room for improvement to achieve an even shorter mode switching time for shifting the running mode to the parallel HV running mode in the second shift mode to achieve higher responsiveness, and to switch the running mode appropriately without making the driver feel uncomfortableness or feel a sense of slowness. For example, when the running mode shifts to the parallel HV running mode as described above, the clutch is engaged to connect the engine to the power transmission path. Generally, engagement and disengagement operations of the clutch are hydraulically controlled. Thus, the engagement of the clutch inevitably involves a response delay. Furthermore, the synchronization control is further performed for the clutch as described above when the running mode is shifted to the parallel HV running mode. In this context, the hybrid vehicle described in WO2012/059996 might be capable of achieving only an insufficiently shortened mode switching time and thus might still make the driver feel uncomfortable or feel a sense of slowness when the running mode is shifted. A higher or larger vehicle speed or drive force might involve a larger clutch engagement shock or vehicle acceleration fluctuation when the running mode is shifted, compared with a lower or smaller vehicle speed or drive force. Thus, the drivability of the hybrid vehicle might be compromised.

SUMMARY

Embodiments of the disclosure are made in view of the above, and an object thereof is to provide a hybrid vehicle in which a running mode can be appropriately switched without making a driver feel uncomfortable or feel a sense of slowness.

In order to achieve the above-described object, there is provided a hybrid vehicle comprising: a prime mover including an engine and a motor; drive wheels that are driven by power from the prime mover to generate drive force; a clutch that selectively transmits power and interrupts power transmission between the engine and the drive wheels; and a controller that controls each of the engine, the motor, and the clutch. A running mode of the hybrid vehicle may be selected from: an electric vehicle mode in which the drive force is generated by torque generated by the motor while stopping the engine; and a parallel hybrid vehicle mode in which the engine is operated while engaging the clutch, and the drive force is generated by torques generated by the engine and the motor. The controller may be configured to shift the running mode to the parallel hybrid vehicle mode in a case of accelerating the hybrid vehicle in the electric vehicle mode, if the drive force is greater than a maximum drive force generatable in the electric vehicle mode, and also greater than a required additional drive force as a variable corresponding to a running resistance against the hybrid vehicle running on a predetermined running road at a predetermined vehicle speed by a predetermined drive force that is set in advance based on the vehicle speed and the drive force.

In a non-limiting embodiment, the motor may include: a first motor that is disposed to an output side of the engine and that generates electricity when driven at least by the torque of the engine; and a second motor connected to the drive wheels in a power transmittable manner. The running mode of the hybrid vehicle may be selected from: the electric vehicle mode; the parallel hybrid vehicle mode; and a series hybrid vehicle mode in which the engine is operated while disengaging the clutch, the first motor is driven by the torque of the engine to generate electricity, and the drive force is generated by the torque generated by the second motor.

In a non-limiting embodiment, the controller may be further configured to shift the running mode to the parallel hybrid vehicle mode when the vehicle speed enters a speed region in which the required additional drive force is higher than a maximum drive force generatable in the series hybrid vehicle mode.

In a non-limiting embodiment, the maximum drive force generatable in the electric vehicle mode may be set as a line indicating a value that decreases with an increase in the vehicle speed on a running mode shifting map represented by a Cartesian coordinate system defined by coordinate axes representing the vehicle speed and the drive force. The maximum drive force generatable in the series hybrid vehicle mode may be set as a line indicating a value that is larger than the maximum EV drive force and decreases with an increase in the vehicle speed on the running mode shifting map. The required additional drive force may be set as a line indicating a value that increases with an increase in the vehicle speed on the running mode shifting map.

In a non-limiting embodiment, an upper limit vehicle speed at which the maximum series HV drive force and the required additional drive force become equal to each other may be set on the running mode shifting map. The controller may be further configured to shift the running mode to the parallel hybrid vehicle mode when the vehicle speed exceeds the upper limit vehicle speed on the running mode shifting map.

In a non-limiting embodiment, the hybrid vehicle may further comprise a detector that detects or calculates an operation amount and an operation speed of an accelerator, and an actual drive force. The controller may be further configured to: obtain a required drive force based on the vehicle speed and the operation amount of the accelerator; determine whether a driver requires high responsiveness of the drive force based on the operation amount of the accelerator and the operation speed of the accelerator; and shift the running mode to the parallel hybrid vehicle mode when the actual drive force reaches the required drive force, in a case that the driver requires the high responsiveness of the drive force.

In a non-limiting embodiment, the controller may be further configured to shift the running mode to the parallel hybrid vehicle mode when the actual drive force exceeds the maximum drive force generatable in the series hybrid vehicle mode, in a case that the driver requires the high responsiveness of the drive force, and that the required drive force is equal to or greater than a maximum drive force generatable in the series hybrid vehicle mode.

In a non-limiting embodiment, the controller may be further configured to shift the running mode to the parallel hybrid vehicle mode when the actual drive force reaches the required drive force, in a case that the driver requires the high responsiveness of the drive force, and that the required drive force is smaller than a maximum drive force generatable in the series hybrid vehicle mode.

In a non-limiting embodiment, the hybrid vehicle may further comprise a detector that detects or calculates an operation amount and an operation speed of an accelerator, and an actual drive force. The controller may be further configured to: determine whether a driver requires high responsiveness of the drive force based on the operation amount of the accelerator and the operation speed of the accelerator; and shift the running mode to the parallel hybrid vehicle mode when the actual drive force exceeds the required additional drive force, in a case that the driver does not require the high responsiveness of the drive force.

In a non-limiting embodiment, the hybrid vehicle may further comprise a detector that detects or calculates an operation amount and an operation speed of an accelerator, and an actual drive force. The controller may be further configured to: read at least a history of the actual drive force and a history of the operation speed of the accelerator within a predetermined period of time between a current point of time and a point of time earlier than the current point of time; obtain an estimated required drive force required to accelerate the hybrid vehicle based on at least the history of the actual drive force and the history of the operation speed of the accelerator; and shift the running mode to the parallel hybrid vehicle mode when the estimated required drive force is greater than the required additional drive force.

In a non-limiting embodiment, the detector may include a device that detects or estimates a road condition. The controller may be further configured to obtain the estimated required drive force based on at least the history of the actual drive force, the history of the operation speed of the accelerator, and the road condition.

Thus, according to the embodiment of the present disclosure, the running mode is shifted to the parallel hybrid vehicle mode in a case of accelerating the hybrid vehicle in the electric vehicle mode, if the drive force is greater than a maximum drive force generatable in the electric vehicle mode, and also greater than the required additional drive force. According to the embodiment of the present disclosure, therefore, the engine has already been started and the clutch has already been engaged when the vehicle speed and the drive force are increased and hence the running mode is shifted to the parallel hybrid vehicle mode.

In the hybrid vehicle, the series hybrid vehicle mode may also be selected to propel the hybrid vehicle in an operating region between a region for running in the electric vehicle mode and a region for running in the parallel hybrid vehicle mode. With this configuration, the hybrid vehicle accelerated in the electric vehicle mode is caused to run in the parallel hybrid vehicle mode in response to the drive force exceeding the required additional drive force in a case where the maximum drive force generatable in the electric vehicle mode and falling below the maximum drive force generatable in the series hybrid vehicle mode. Thus, even in the region for running in the series hybrid mode, the running mode shifts to the parallel hybrid mode in response to the drive force exceeding the required additional drive force. As a result, the engine is started and the clutch is engaged at the timing when the hybrid vehicle accelerated is required to run in the parallel hybrid vehicle mode due to an increase in the vehicle speed and the drive force (that is, when the vehicle runs in a region with the vehicle speed and the drive force exceeding the maximum series HV drive force $S_{max}$).

For these reasons, the running mode may be shifted to the parallel hybrid vehicle mode when accelerating the hybrid vehicle with no response delay of the engine or the clutch. All things considered, the vehicle can be accelerated with the running mode appropriately shifted without making the driver feel a sense of slowness.

The engine is started and the clutch is engaged to shift the running mode after the drive force exceeds the required additional drive force. In other words, the running mode is shifted while starting the engine and engaging the clutch in a running region where torque pulse and acceleration fluctuation during starting the engine, as well as shift shock and engagement shock of the clutch can be tolerated. Therefore, the torque pulse and the acceleration fluctuation during starting the engine, as well as the shift shock and the engagement shock of the clutch can be reduced during the acceleration involving shifting of the running mode.

For example, the engine is started and the clutch is engaged to shift the running mode in a running region with the vehicle speed and the drive force not exceeding the maximum drive force generatable in the series hybrid vehicle mode on the running mode switching map represented by the Cartesian coordinate system defined by the coordinate axes representing the vehicle speed and the drive force. Therefore, the running mode switching involving the starting of the engine and the engagement of the clutch is implemented with the vehicle speed and the drive force lower than those in a case where the running mode is shifted in a running region with the vehicle speed and the drive force exceeding the maximum drive force generatable in the series hybrid vehicle mode. For this reason, the torque pulse and the acceleration fluctuation during starting the engine, as well as the shift shock and the engagement shock of the clutch can be reduced during the acceleration involving shifting of the running mode. All things considered, the vehicle can be accelerated with the running mode appropriately switched without making the driver feel uncomfortable.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present disclosure will now be explained with reference to the accompanying drawings.

The vehicle controlled according to an embodiment of the disclosure is a hybrid vehicle (HV) in which a prime mover includes an engine and a motor. For example, the motor includes a first motor and a second motor. The first motor is disposed on an output side of the engine, and has a function of generating power upon being driven by receiving engine torque output from the engine. The second motor is connected to drive wheels in a power transmittable manner. A clutch is disposed between the drive wheels and each of the engine and the first motor to selectively transmit torque and interrupt torque transmission therebetween. Thus, in the hybrid vehicle according the embodiment of the disclosure, the engine and the first motor can be disconnected from a drive system when the clutch is disengaged. In this state, the hybrid vehicle may be powered by the second motor. Thus, the hybrid vehicle can run as an electric vehicle (EV) using the second motor as the prime mover. When the clutch is engaged, the hybrid vehicle may be powered by at least the engine. Alternatively, the hybrid vehicle may also be powered by the engine and the first and the second motors.

The vehicle controlled according to an embodiment of the disclosure may also be a hybrid vehicle in which the prime mover includes an engine and a single motor. In this case, a running mode of the hybrid vehicle may be selected from: an electric vehicle mode in which torque of the motor is delivered to the drive wheels while stopping the engine (i.e., the below-mentioned EV mode); and a parallel hybrid vehicle mode in which torques of the engine and the motor are delivered to the drive wheels while engaging the clutch (i.e., the below-mentioned parallel HV mode).

Figure 1:
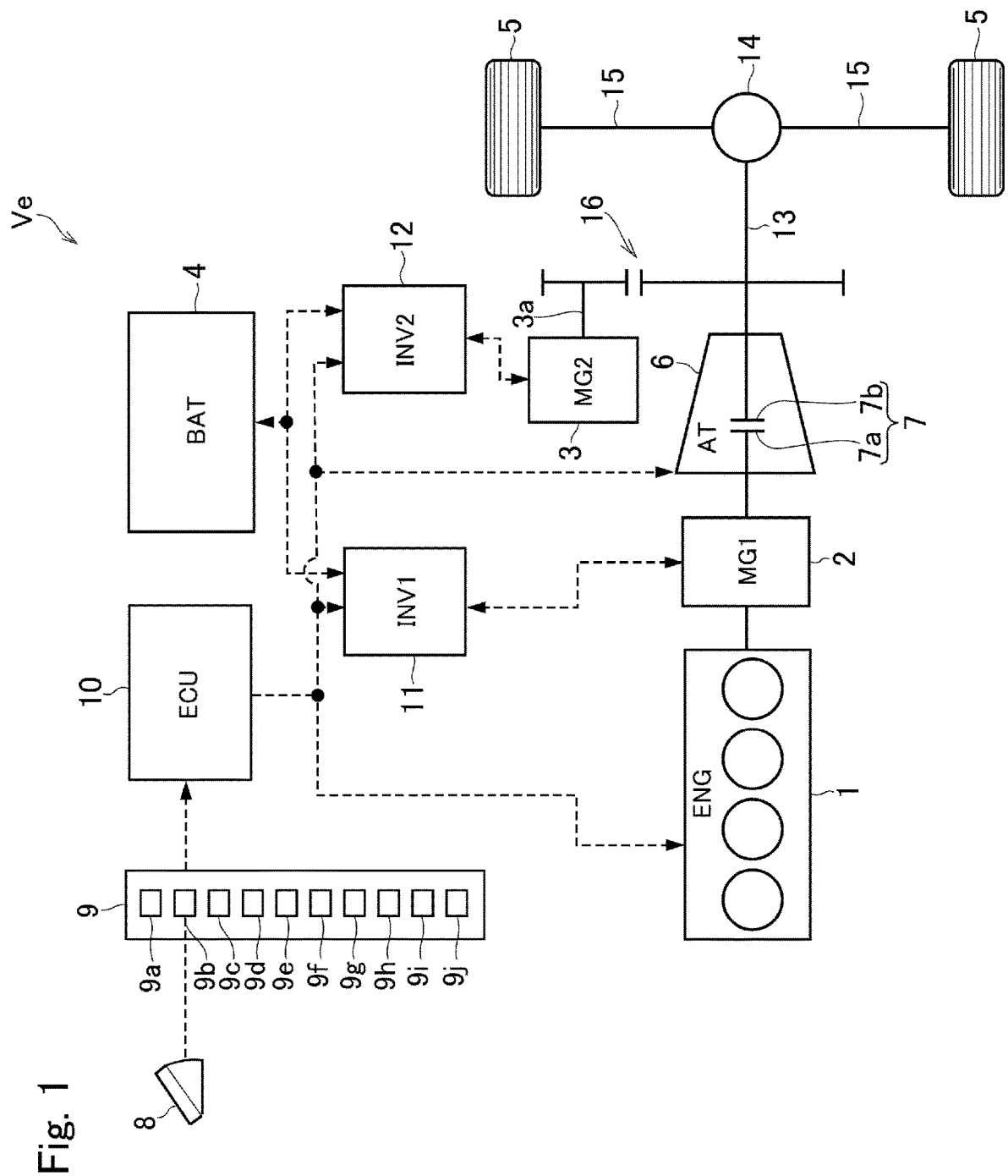
FIG. 1 is a diagram illustrating a driving system (a drive system and a control system) of a hybrid vehicle according to the disclosure.

Referring now to FIG. 1, there is shown an example of a drive system (a drive system and a control system) of a hybrid vehicle controlled by the embodiment of the present disclosure. A hybrid vehicle (hereinafter, referred to as a vehicle) Ve illustrated in FIG. 1 has a prime mover including an engine (referred to as "ENG" in FIG. 1) 1, a first motor (referred to as "MG1" in FIG. 1) 2 and a second motor (referred to as "MG2" in FIG. 1) 3. The vehicle Ve comprises a battery (referred to as "BAT" in FIG. 1) 4, drive wheels 5, a transmission (referred to as "AT" in FIG. 1) 6, a clutch 7, an accelerator pedal 8, a detector 9, and a controller (referred to as "ECU" in FIG. 1) 10.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The first motor 2 is disposed on the output side of the engine 1. The first motor 2 serves not only as a motor to generate torque when driven by electricity suppled thereto, but also as a generator to generate electricity when driven by torque of the engine 1. Thus, the first motor 2 is a motor-generator. For example, a permanent magnet type synchronous motor, and an induction motor may be adopted as the first motor 2. The first motor 2 is connected to the battery 4 through a first inverter (referred to as "INV1" in FIG. 1) 11 so that the electricity generated by the first motor 2 can be accumulated in the battery 4. Specifically, the first motor 2 may be operated as a motor to generate torque by supplying the electricity to the first motor 2 from the battery 4.

Likewise, the second motor 3 serves not only as a motor to generate torque when driven by electricity suppled thereto, but also as a generator to generate electricity when driven by torque applied thereto from an external source. Thus, the second motor 3 is also a motor-generator. For example, a permanent magnet type synchronous motor, and an induction motor may also be adopted as the second motor 3. The second motor 3 is connected to the battery 4 through a second inverter (referred to as "INV2" in FIG. 1) 12. Specifically, the second motor 3 may be operated as a motor to generate torque by supplying electricity to the second motor 3 from the battery 4. As described later, the second motor 3 is connected to the drive wheels 5 in a power transmittable manner. That is, the second motor 3 may be driven as a generator by torque transmitted thereto from the drive wheels 5, and the resultant electricity may be accumulated in the battery 4. The first motor 2 and the second motor 3 are connected to each other through the first inverter 11 and the second inverter 12 and hence the electricity can be exchanged therebetween. The second motor 3 may also be allowed to generate torque by directly supplying electricity generated by the first motor 2.

The battery 4 is a power storage device that stores electricity generated by the first motor 2 and the second motor 3, and is electrically connected to each of the first motor 2 and the second motor 3. With this configuration, the electricity generated by the first motor 2 may be accumulated in the battery 4, and the first motor 2 may be operated as a motor by supplying electricity to the first motor 2 from the battery 4. Similarly, the electricity generated by the second motor 3 may also be stored in the battery 4, and the second motor 3 may be operated as a motor by supplying electricity to the second motor 3 from the battery 4. The power storage device is not limited to the battery 4 illustrated in FIG. 1, and may be a capacitor for example.

According to the embodiment illustrated in FIG. 1, the prime mover, including the engine 1 and the first motor 2, are connected to the drive wheels 5 through the transmission 6, the clutch 7, a propeller shaft 13, a differential gear 14, and a drive shaft 15 so that the drive torque of the prime mover is delivered to the drive wheels 5. Thus, the vehicle Ve shown in FIG. 1 is a rear-drive layout vehicle in which a drive torque is delivered to rear wheels (drive wheels 5) to generate drive force. Nonetheless, the present disclosure may also be applied to a front-drive layout vehicle in which the drive torque is delivered to front wheels, and a four-wheel-drive vehicle in which the drive torque is each of the front and rear pairs of wheels.

The transmission 6 is disposed on the output side of the first motor 2 to transmit torque between the drive wheels 5 and each of the engine 1 and the first motor 2. For example, an automatic transmission such as a geared transmission and a continuously variable transmission may be used as the transmission 6. The transmission 6 is adapted to change a ratio of a speed of an input shaft to a speed of an output shaft arbitrarily. Preferably, the transmission 6 is provided with a clutch mechanism that is engaged to transmit torque, and that is disengaged to interrupt torque transmission thereby establishing a neutral stage. For example, a multi-stage automatic transmission in which eight stages or more stages can be established may be used as the transmission 6.

The clutch 7 selectively transmits torque or interrupts torque transmission between the drive wheels 5 and each of the engine 1 and the first motor 2. In the embodiment illustrated in FIG. 1, the clutch 7 includes the clutch mechanism arranged in the transmission 6. Specifically, the clutch 7 includes a friction plate 7a connected to a rotary member (not shown) on the side of the engine 1 and the first motor 2, and a friction plate 7b connected to a rotary member (not shown) on the side of the drive wheels 5. Although not elaborated in FIG. 1, a multi-plate clutch in which a plurality of the friction plates 7a and a plurality of the friction plates 7b are arranged alternately may be adopted as the clutch 7. Instead, the clutch 7 may also be disposed between the first motor 2 and the transmission 6 to serve as a starting clutch. In any of the cases, the engine 1 and the first motor 2 are disconnected from the powertrain of the vehicle Ve when the clutch 7 is disengaged, and connected to the powertrain when the clutch 7 is engaged.

The second motor 3 is disposed on the output side of the transmission 6 and is connected to the powertrain of the vehicle Ve so that torque of the second motor 3 is delivered to the drive wheels 5. In the embodiment illustrated in FIG. 1, specifically, an output shaft 3a of the second motor 3 is connected to the propeller shaft 13 or an output shaft (not shown) of the transmission 6 through a reduction gear pair 16. Thus, the torque of the second motor 3 is amplified by the reduction gear pair 16 and the differential gear 14 to be delivered to the drive wheels 5. In the vehicle Ve, therefore, the drive force can be generated by delivering the torque from the second motor 3 to the drive wheels 5 even if the engine 1 is stopped. When the clutch 7 is in disengagement, the first motor 2 may be operated as a generator by the engine torque, and the second motor 3 may be operated as a motor to deliver torque to the drive wheels 5 thereby generating the drive force. When the clutch 7 is in disengagement, the drive force may be generated by delivering torques of the engine 1 and the second motor 3.

The accelerator pedal 8 is an operation device operated by the driver to control the drive force of the vehicle Ve. In the vehicle Ve, a power generated by the prime mover, that is, torques of the engine 1, the first motor 2, and the second motor 3 is controlled in accordance with an operation amount or a depression of the accelerator pedal 8. As described later, the accelerator pedal 8 is provided with an accelerator position sensor 9b for detecting an operation amount and an operation speed of the accelerator pedal 8. The accelerator position sensor 9b transmits detection data of the operation amount and the operation speed of the accelerator pedal 8 in the form of electric signal.

The detector 9 collectively represents sensors and devices that each detect or calculate at least a vehicle speed of the vehicle Ve, the operation amount and the operation speed of the accelerator pedal 8, and the actual drive force of the vehicle Ve. Specifically, the detector 9 comprises: a wheel speed sensor 9a that detects rotational speeds of the drive wheels 5 as well as the other wheels (not shown); the accelerator position sensor 9b that detects an operation amount and an operation speed of the accelerator pedal 8 operated by the driver; an engine speed sensor 9c that detects a rotational speed of the engine 1; a first motor speed sensor (or a resolver) 9d that detects a rotational speed of the first motor 2; a second motor sensor (or a resolver) 9e that detects a rotational speed of the second motor 3; an input speed sensor 9f that detects an input speed to the clutch 7 (for example, a rotational speed of the friction plate 7a or the input shaft of the transmission 6); an output speed sensor 9g that detects an output speed from the clutch 7 (for example, a rotational speed of the friction plate 7b or the output shaft of the transmission 6); and a calculator 9h that calculates an actual drive force of the vehicle Ve based on detection values of the wheel speed sensor 9a and the output speed sensor 9g. The detector 9 may further comprise a navigation system 9i utilizing a Global Positioning System (GPS) and external data transmission/reception system 9j. For example, the external data transmission/reception system 9j acquires data through inter vehicle communication between the vehicle Ve and a vehicle ahead or in the vicinity of the vehicle Ve, and through road-vehicle communication between the vehicle Ve and an external object such as a communication device or a signpost on or beside a road. The external data transmission/reception system 9j may also acquire data from an external data center storing big data updated continuously. The detector 9 is electrically connected to the controller 10 so that detection data based on a detection or calculation value obtained by the sensors is transmitted to the controller 10 in the form of electric signal.

The controller 10 is mainly in charge of controlling each of the engine 1, the first motor 2, the second motor 3, the transmission 6, and the clutch 7. The controller 10 is an electronic control unit including a microcomputer. The controller 10 receives various kinds of data detected or calculated by the detector 9 described above. The controller 10 performs calculation using the incident data, and data and formulas and the like stored in advance. Calculation results are transmitted from the controller 10 to the engine 1, the first motor 2, the second motor 3, the transmission 6, the clutch 7, and so on in the form of command signal.

A running mode of the vehicle Ve may be selected form a plurality of modes by controlling the engine 1, the first motor 2, the second motor 3, and the clutch 7 by the controller 10. Specifically, the running mode of the vehicle Ve may be selected from: (1) an electric vehicle mode (to be abbreviated as the "EV mode" hereinafter) in which a drive force is generated by delivering torque generated by the second motor 3 to the drive wheels 5 while stopping the engine 1; (2) a series hybrid vehicle mode (to be abbreviated as the "series HV mode" hereinafter) in which the engine 1 is operated while disengaging the clutch 7, the first motor 2 is operated as a generator by a torque of the engine 1 to generate electricity, and a drive force is generated by delivering torque generated by the second motor 3 to the drive wheels 5; and (3) a parallel hybrid vehicle mode (to be abbreviated as the "parallel HV mode" hereinafter) in which the engine 1 is operated while engaging the clutch 7, and a drive force is generated by delivering torques of the engine 1 and the second motor 3 to the drive wheels 5.

As described above, in the vehicle Ve according to the embodiment of the disclosure, the first motor 2 may be omitted from the prime mover. In this case, the running mode of the vehicle Ve is selected from the EV mode and the parallel HV mode.

For example, in the vehicle Ve according to the embodiment of the disclosure, the running mode is selected with reference to a later-described shift map of the running mode shown in FIG. 3. Instead, the running mode may also be selected with reference to a shift map taught by WO2012/059996 in which a required drive force and a vehicle speed are employed as parameters.

In the vehicle Ve according to the embodiment of the present disclosure, the running mode is shifted without making the driver feel uncomfortable or feel a sense of slowness. To this end, the controller 10 of the vehicle Ve is configured to execute a routine shown in FIG. 2.

In most cases, the driver feels such a sense of slowness when accelerating vehicle Ve during propulsion in the EV mode while shifting the running mode to another mode. In view of this, the routine shown in FIG. 2 is executed while the vehicle Ve travels in the EV mode.

Figure 2:
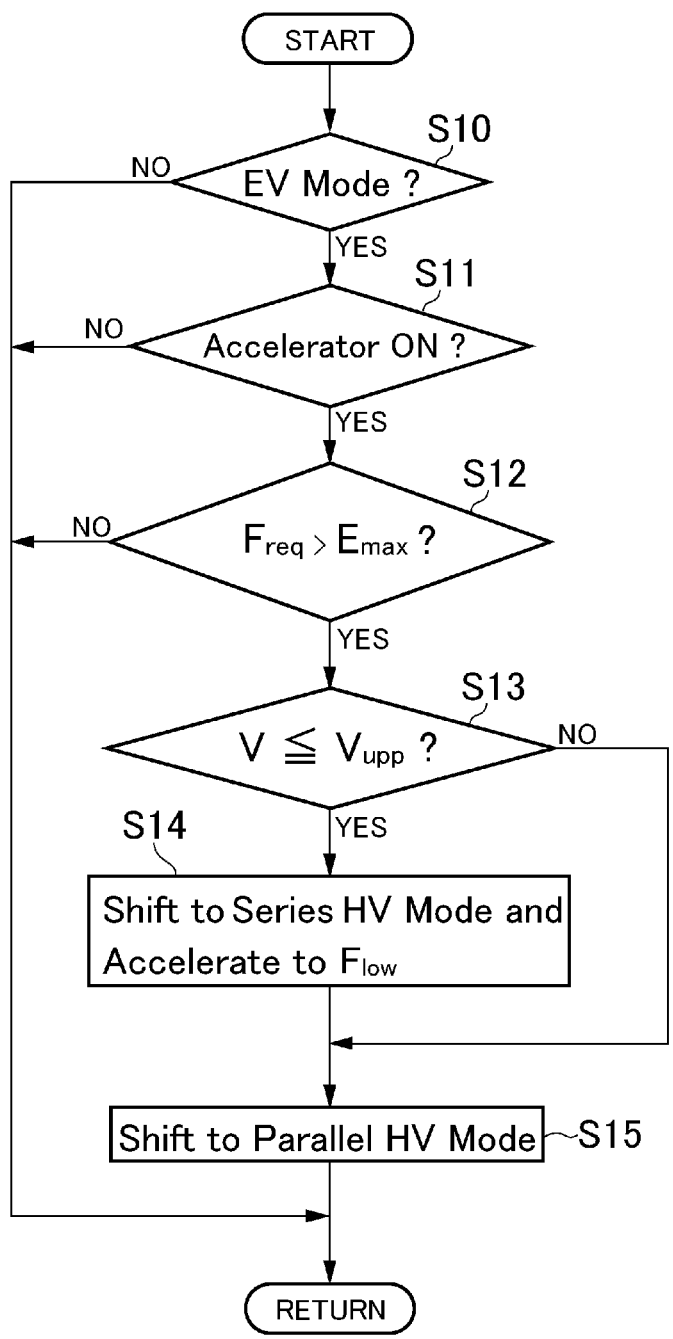
FIG. 2 is a flowchart illustrating an example (a basic control example) of control executed by a controller of the hybrid vehicle according to the disclosure.

In the routine shown in FIG. 2, at step S10, it is determined whether the vehicle Ve travels in the EV mode. If the vehicle Ve does not travel in the EV mode so that the answer of step S10 is NO, the routine returns without executing any specific control. If the vehicle Ve travels in the EV mode so that the answer in step S10 is YES, the routine proceeds to step S11.

At step S11, it is determined whether accelerator is on, that is, whether the accelerator pedal 8 has been depressed in an amount greater than a predetermined operation amount. Specifically, it is determined whether a depression of the accelerator pedal 8 detected by the accelerator position sensor 9b is greater than a threshold value of the operation amount of the accelerator pedal 8. For example, the threshold value is set to a lower limit value of an operation amount of the accelerator pedal 8 by which the vehicle Ve is accelerated in the EV mode, based on a result of an experiment or simulation.

If the depression of the accelerator pedal 8 is smaller than the threshold value so that the answer of step S11 is NO, the routine returns without executing any specific control. By contrast, if the depression of the accelerator pedal 8 is greater than the threshold value so that the answer in step S11 is YES, the routine proceeds to step S12.

At step S12, it is determined whether a required drive force $F_{req}$ is greater than a maximum EV drive force $E_{max}$. For example, the required drive force $F_{req}$ is obtained based on operation amount of the accelerator pedal 8 and a vehicle speed. The maximum EV drive force $E_{max}$ is a substantially largest drive force possible to be generated during propulsion in the EV mode. The maximum EV drive force $E_{max}$ is governed by a characteristic curve of the second motor 3, a capacity of the battery 4, and so on. Specifically, as indicated in FIG. 3, the maximum EV drive force $E_{max}$ is set to be smaller with an increase in a vehicle speed, in a Cartesian coordinate system defined by coordinate axes representing the vehicle speed and the drive force.

If the required drive force $F_{req}$ is smaller than the maximum EV drive force $E_{max}$ so that the answer in step S12 is NO, the routine returns without executing any specific control. In this case, since the required drive force $F_{req}$ does not exceed the maximum EV drive force $E_{max}$, the required drive force $F_{req}$ can be achieved to accelerate the vehicle Ve in the EV mode. By contrast, if the required drive force $F_{req}$ is greater than maximum EV drive force $E_{max}$ so that the answer in step S12 is YES, the routine proceeds to step S13.

At step S13, it is determined whether a current vehicle speed V is equal to or lower than an upper limit vehicle speed $V_{upp}$. The upper limit vehicle speed $V_{upp}$ is a speed of the vehicle Ve at which a required additional drive force $F_{low}$ and a maximum series HV drive force $S_{max}$ become equal to each other on the Cartesian coordinate system defined by the coordinate axes representing the vehicle speed and the drive force as shown in FIG. 3.

Figure 3:
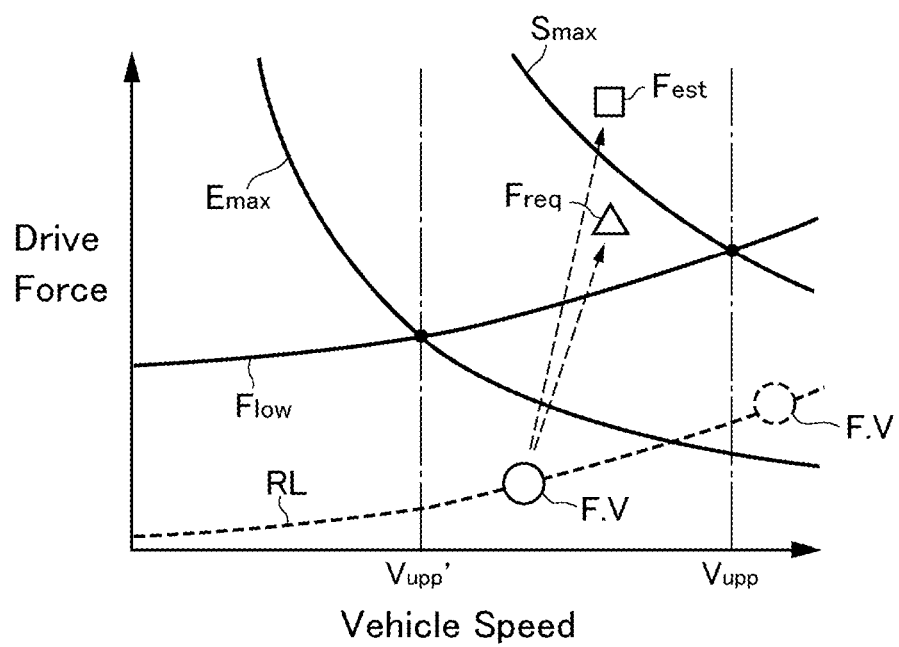
FIG. 3 is a diagram illustrating a "running mode shifting map" used for executing the control illustrated in the flowchart in FIG. 2 (a Cartesian coordinate system defined by coordinate axes representing a vehicle speed and a drive force)

Specifically, the maximum series HV drive force $S_{max}$ and the required additional drive force $F_{low}$ are set on the Cartesian coordinate system illustrated in FIG. 3. The vehicle speed at which the required additional drive force $F_{low}$ and the maximum series HV drive force $S_{max}$ become equal to each other on the Cartesian coordinate system illustrated in FIG. 3 is set as the upper limit vehicle speed $V_{upp}$.

The maximum series HV drive force $S_{max}$ is a substantially largest drive force possible to be generated during propulsion in the series HV mode. The maximum series HV drive force $S_{max}$ is also governed by a characteristic curve of the second motor 3, the capacity of the battery 4, a capacity of the first motor 2 serving as the generator, and so on. Specifically, the maximum series HV drive force $S_{max}$ is set to be smaller with an increase in a speed of the vehicle Ve on the Cartesian coordinate system illustrated in FIG. 3. Specifically, the maximum series HV drive force $S_{max}$ is set in a region where the speed of the vehicle Ve is higher than that of the maximum EV drive force $E_{max}$ and the drive force is greater than that of the maximum EV drive force $E_{max}$ in the Cartesian coordinate system illustrated in FIG. 3.

The required additional drive force $F_{low}$ corresponds to a running resistance against the vehicle Ve running on a predetermined road at a predetermined speed by a predetermined drive force, and is a variable governed by a vehicle speed and a drive force. The required additional drive force $F_{low}$ is set to be larger with an increase in a speed of the vehicle Ve in the Cartesian coordinate system illustrated in FIG. 3, based on a result of an experiment or simulation. In a running region where the vehicle speed and the drive force fall below the required additional drive force $F_{low}$, the driver and a passenger are likely to feel a shift shock of the transmission 6, an engagement shock and response delay of the clutch 7, and torque pulse caused by starting the engine 1. In other words, when the vehicle Ve is propelled within the running region where the vehicle speed and the drive force exceed the required additional drive force $F_{low}$, the driver and a passenger may be insensitive to the transmission shock, the engagement shock, the response delay, and the torque pulse and the acceleration fluctuation caused by starting the engine 1. Therefore, when the vehicle is running in the running region where the vehicle speed and the drive force exceed the required additional drive force $F_{low}$, the torque pulse and the acceleration fluctuation caused by starting the engine 1 would be tolerable for the driver and the passenger.

As described above, the upper limit vehicle speed $V_{upp}$ is a vehicle speed at an intersecting point between the maximum series HV drive force $S_{max}$ and the required additional drive force $F_{low}$ in the Cartesian coordinate system illustrated in FIG. 3. In other words, the upper limit vehicle speed $V_{upp}$ is a vehicle speed at a turning point where an operation condition of the vehicle Ve in which the required additional drive force $F_{low}$ is smaller than the maximum series HV drive force $S_{max}$ turns into a condition in which the maximum series HV drive force $S_{max}$ is smaller than the required additional drive force $F_{low}$. Accordingly, the running region where the vehicle speed V is higher than the upper limit vehicle speed $V_{upp}$ is a vehicle speed region where the required additional drive force $F_{low}$ exceeds the maximum series HV drive force $S_{max}$.

The Cartesian coordinate system shown in FIG. 3 as well as graphs and formulae of the maximum EV drive force $E_{max}$, the maximum series HV drive force $S_{max}$, the required additional drive force $F_{low}$, the upper limit vehicle speed $V_{upp}$, and so on are stored as the shift map of the running mode in the controller 10. In the shift map of the running mode, the maximum EV drive force $E_{max}$ is set in such a manner as to decrease with an increase in the vehicle speed. That is, a line representing the maximum EV drive force $E_{max}$ is a boundary changing depending on the vehicle speed. The maximum series HV drive force $S_{max}$ is set greater than the maximum EV drive force $E_{max}$ and decreases with an increase in the vehicle speed. That is, a line representing the maximum series HV drive force $S_{max}$ is also a boundary changing depending on the vehicle speed. The required additional drive force $F_{low}$ is set in such a manner as to increase with an increase in the vehicle speed. That is, a line representing the required additional drive force $F_{low}$ is also a boundary changing depending on the vehicle speed.

A dotted curve RL in FIG. 3 represents a road load (a running load imposed on the vehicle Ve in accordance with the vehicle speed). That is, FIG. 3 illustrates a situation where the vehicle Ve steadily running in a normal state against a road load by the actual drive force F at a vehicle speed V (referred to as ○ in FIG. 3) is accelerated to achieve a required drive force $F_{req}$ (referred to as △ in FIG. 3) or an estimated required drive force $F_{est}$ (referred to as □ in FIG. 3) described later.

Given that the prime mover includes only the engine 1 and the second motor 3 as described above, the maximum EV drive force $E_{max}$ and the required additional drive force $F_{low}$ are determined by the shift map of the running mode.

Turning back to FIG. 2, if the vehicle speed V is equal to or lower than the upper limit vehicle speed $V_{upp}$ so that the answer in step S13 is YES, the routine proceeds to step S14.

At step S14, the running mode of the vehicle Ve is shifted from the EV mode to the series HV mode. In this situation, the vehicle Ve is accelerated to achieve the required drive force $F_{req}$ until the actual drive force F of the vehicle Ve reaches the required additional drive force $F_{low}$. Specifically, the engine 1 is started in a state where the clutch 7 is disengaged to shift the running mode from the EV mode to the series HV mode. The vehicle Ve is accelerated in the series HV mode until the actual drive force F reaches the required additional drive force $F_{low}$.

Thereafter, when the actual drive force F exceeds the required additional drive force $F_{low}$, the routine proceeds to step S15, and the running mode of the vehicle Ve is shifted from the series HV mode to the parallel HV mode. In this situation, the vehicle Ve is accelerated in the series HV mode until the actual drive force F reaches the required additional drive force $F_{low}$ on the shift map illustrated in FIG. 3, and when the actual drive force F exceeds the required additional drive force $F_{low}$, the running mode is shifted to the parallel HV mode. Specifically, the running mode is shifted from the series HV mode to the parallel HV mode by engaging the clutch 7 while driving the engine 1 and operating the first motor 2 as a generator.

Thus, in the case of accelerating the vehicle Ve in the EV mode, the running mode is shifted to the parallel HV mode when the actual drive force F exceeds the required additional drive force $F_{low}$ if the required drive force $F_{req}$ is larger than the maximum EV drive force $E_{max}$ but smaller than the maximum series HV drive force $S_{max}$. That is, the running mode is shifted to the parallel HV mode when the actual drive force F becomes greater than the required additional drive force $F_{low}$, even if the vehicle is propelled in the operating region where the vehicle Ve is propelled in the series HV mode.

Specifically, the running mode is shifted from the EV mode to the parallel HV mode by starting the engine 1 while engaging the clutch 7. That is, when the vehicle Ve is operated in the region in the map shown in FIG. 3 where the vehicle speed and the drive force are greater than the maximum series HV drive force $S_{max}$ and hence the running mode is shifted to the parallel HV mode, the engine 1 has already been and the clutch 7 has already been engaged. For this reason, the vehicle Ve is allowed to be accelerated in the parallel HV mode with no response delay or time lag which might otherwise be caused due to startup of the engine 1 and engagement of the clutch 7.

Thus, the engine 1 is started and the clutch 7 is engaged to shift the running mode in a state where the actual drive force F exceeds the required additional drive force $F_{low}$. In other words, a shifting operation of the running mode requiring a startup of the engine 1 and an engagement of the clutch 7 is implemented in the operating region where the torque pulse, the acceleration change, the shift shock, the engagement shock of the clutch, and resultant response delay of acceleration are tolerable. For this reason, the driver or the passenger can be prevented from feeling such changes in the torque and the acceleration as well as the shift shocks or the like during acceleration of the vehicle Ve while shifting the running mode.

In addition, the startup of the engine 1 and the engagement of the clutch 7 are executed in the operating region in the map shown in FIG. 3 where the vehicle speed and the drive force do not exceed the maximum series HV drive force $S_{max}$. That is, the engine 1 is started and the clutch 7 is engaged to shift the running mode to the parallel HV mode in the condition where the vehicle speed and the drive force are lower in comparison with those of a case in which the running mode is shifted in an operating region where the vehicle speed and the drive force exceed the maximum series HV drive force $S_{max}$. All things considered, the torque pulse and the acceleration fluctuation as well as the shift shock and the engagement shock of the clutch 7 can be reduced during acceleration involving the switching operation of the running mode.

Turning back to FIG. 2, if the vehicle speed V is higher than the upper limit vehicle speed $V_{upp}$ so that the answer of step S13 is NO, the routine skips step S14 and proceeds to step S15. That is, the running mode is shifted to the parallel HV mode when the vehicle speed V enters a speed range where the required additional drive force $F_{low}$ exceeds the maximum series HV drive force $S_{max}$ As described above, in the speed range where the vehicle speed V is higher than the upper limit vehicle speed $V_{upp}$, the required additional drive force $F_{low}$ exceeds the maximum series HV drive force $S_{max}$. Therefore, when the vehicle Ve is accelerated in such speed range, the actual drive force F of the vehicle Ve reaches the maximum series HV drive force $S_{max}$ before the required additional drive force $F_{low}$. Specifically, the running mode of the vehicle Ve is shifted to the parallel HV running mode in the operating region lower than the required additional drive force $F_{low}$ in the map illustrated in FIG. 3. In such a case, the torque pulse and the acceleration fluctuation as well as the transmission shock and the engagement shock of the clutch 7 resulting from the shifting of the running mode are increased with an increase in vehicle speed V. For this reason, in the case of shifting the running mode in the operating region lower than the required additional drive force $F_{low}$, it is advantageous to shift the running mode with a lower vehicle speed V.

Thus, according to the routine shown in FIG. 2, the running mode is shifted immediately to the parallel HV mode even if the required drive force $F_{req}$ is lower than the maximum series HV drive force $S_{max}$, when the vehicle Ve is accelerated at the speed higher than the upper limit vehicle speed $V_{upp}$, that is, in the speed range where the required additional drive force $F_{low}$ is greater than the maximum series HV drive force $S_{max}$. For this reason, the running mode can be shifted with the lower vehicle speed V. As a result, the torque pulse and the acceleration fluctuation as well as the transmission shock and the engagement shock of the clutch 7 can be reduced during the acceleration while shifting the running mode. Furthermore, in an operating region where the required additional drive force $F_{low}$ can be achieved only in the parallel HV running mode, it is possible to reduce the response delay of acceleration resulting from engagement of the clutch 7 during the mode shift by shifting the running mode to the parallel HV mode in advance.

Thus, when the vehicle Ve is accelerated to the required additional drive force $F_{low}$ at step S14, or when the vehicle speed V is raised higher than the upper limit vehicle speed $V_{upp}$ in step S13, the routine proceeds to step S15 to shift the running mode to the parallel HV mode, and thereafter the routine returns.

The routine shown in FIG. 2 may also be executed in the hybrid vehicle in which the prime mover includes only the engine 1 and the second motor 3. In such a case, for example, it is determined whether the current vehicle speed V is equal to or lower than an upper limit vehicle speed $V_{upp}'$ at step S13. As shown in FIG. 3, the upper limit vehicle speed $V_{upp}'$ is a vehicle speed at which the required additional drive force $F_{low}$ and the maximum EV drive force $E_{max}$ intersect to each other on the Cartesian coordinate system shown in FIG. 3. If the vehicle speed V is equal to or lower than the upper limit vehicle speed $V_{upp}'$ so that the answer in this step S13 is YES, the routine proceeds to step S14.

At step S14, the vehicle Ve is accelerated to achieve the required drive force $F_{req}$ until the actual drive force F of the vehicle Ve reaches the required additional drive force $F_{low}$. In this case, since the vehicle Ve is not provided with the first motor 2, the series HV may not be established. That is, the vehicle Ve is accelerated until the actual drive force Fe reaches the required additional drive force $F_{low}$.

Then, when the actual drive force F exceeds the required additional drive force $F_{low}$, the routine proceeds to step S15, and the running mode of the vehicle Ve is shifted from the EV mode to the parallel HV mode. Specifically, the vehicle Ve is accelerated in the EV running mode until the actual drive force F reaches the required additional drive force $F_{low}$ in the map shown in FIG. 3, and when the actual drive force F exceeds the required additional drive force $F_{low}$, the running mode is shifted from the EV mode to the parallel HV mode by starting the engine 1 while engaging the clutch 7.

Thus, in the case of accelerating the hybrid vehicle in which the prime mover includes only the engine 1 and the second motor 3 in the EV mode, the running mode is also shifted to the parallel HV mode when the actual drive force F exceeds the required additional drive force $F_{low}$ in a state where the required drive force $F_{req}$ is greater than the maximum EV drive force $E_{max}$. That is, when the actual drive force F exceeds the required additional drive force $F_{low}$, the running mode is shifted to the parallel HV mode even in the operating region where the actual drive force F is lower than the maximum EV drive force $E_{max}$.

Specifically, the running mode is shifted from the EV mode to the parallel HV mode by starting the engine 1 while engaging the clutch 7. Consequently, the vehicle speed V and the actual drive force F can be increased. In addition, since the engine 1 has already been started and the clutch 7 has already been engaged when the vehicle Ve is required to be propelled in the parallel HV mode. Therefore, the vehicle Ve can be accelerated in the parallel HV mode without response delay or time lag as might otherwise be caused by starting the engine 1 and engaging the clutch 7.

Thus, the engine 1 is started and the clutch 7 is engaged to shift the running mode in a state where the actual drive force F exceeds the required additional drive force $F_{low}$. In other words, a shifting operation of the running mode requiring a startup of the engine 1 and an engagement of the clutch 7 is implemented in the operating region where the torque pulse, the acceleration change, the shift shock, the engagement shock of the clutch, and resultant response delay of acceleration are tolerable. For this reason, the driver or the passenger can be prevented from feeling such changes in the torque and the acceleration as well as the shift shocks or the like during acceleration of the vehicle Ve while shifting the running mode.

By contrast, if the vehicle speed V is higher than the upper limit vehicle speed $V_{upp}'$ so that the answer of step S13 is NO, the routine skips step S14 and proceeds to step S15. That is, the running mode is shifted to the parallel HV mode when the vehicle speed V enters a speed range where the required additional drive force $F_{low}$ exceeds the maximum EV drive force $E_{max}$. As described above, in the speed range where the vehicle speed V is higher than the upper limit vehicle speed $V_{upp}'$, the required additional drive force $F_{low}$ exceeds the maximum $E_{max}$ drive force $E_{max}$. Therefore, when the vehicle Ve is accelerated in such speed range, the actual drive force F of the vehicle Ve reaches the maximum $E_{max}$ drive force $E_{max}$ before the required additional drive force $F_{low}$. Specifically, the running mode of the vehicle Ve is shifted to the parallel HV running mode in the operating region lower than the required additional drive force $F_{low}$ in the map illustrated in FIG. 3. In such a case, the torque pulse and the acceleration fluctuation as well as the transmission shock and the engagement shock of the clutch 7 resulting from the shifting of the running mode are increased with an increase in vehicle speed V. For this reason, in the case of shifting the running mode in the operating region lower than the required additional drive force $F_{low}$, it is advantageous to shift the running mode with a lower vehicle speed V.

Thus, in the vehicle Ve without having the first motor 2, the running mode is shifted immediately to the parallel HV mode even if the required drive force $F_{req}$ is lower than the maximum EV drive force $E_{max}$, when the vehicle Ve is accelerated at the speed higher than the upper limit vehicle speed $V_{upp}'$, that is, in the speed range where the required additional drive force $F_{low}$ is greater than the maximum EV drive force $E_{max}$. For this reason, the running mode can be shifted with the lower vehicle speed V. As a result, the torque pulse and the acceleration fluctuation as well as the transmission shock and the engagement shock of the clutch 7 can be reduced during the acceleration while shifting the running mode. Furthermore, in an operating region where the required additional drive force $F_{low}$ can be achieved only in the parallel HV running mode, it is possible to reduce the response delay of acceleration resulting from engagement of the clutch 7 during the mode shift by shifting the running mode to the parallel HV mode in advance.

Figure 4:
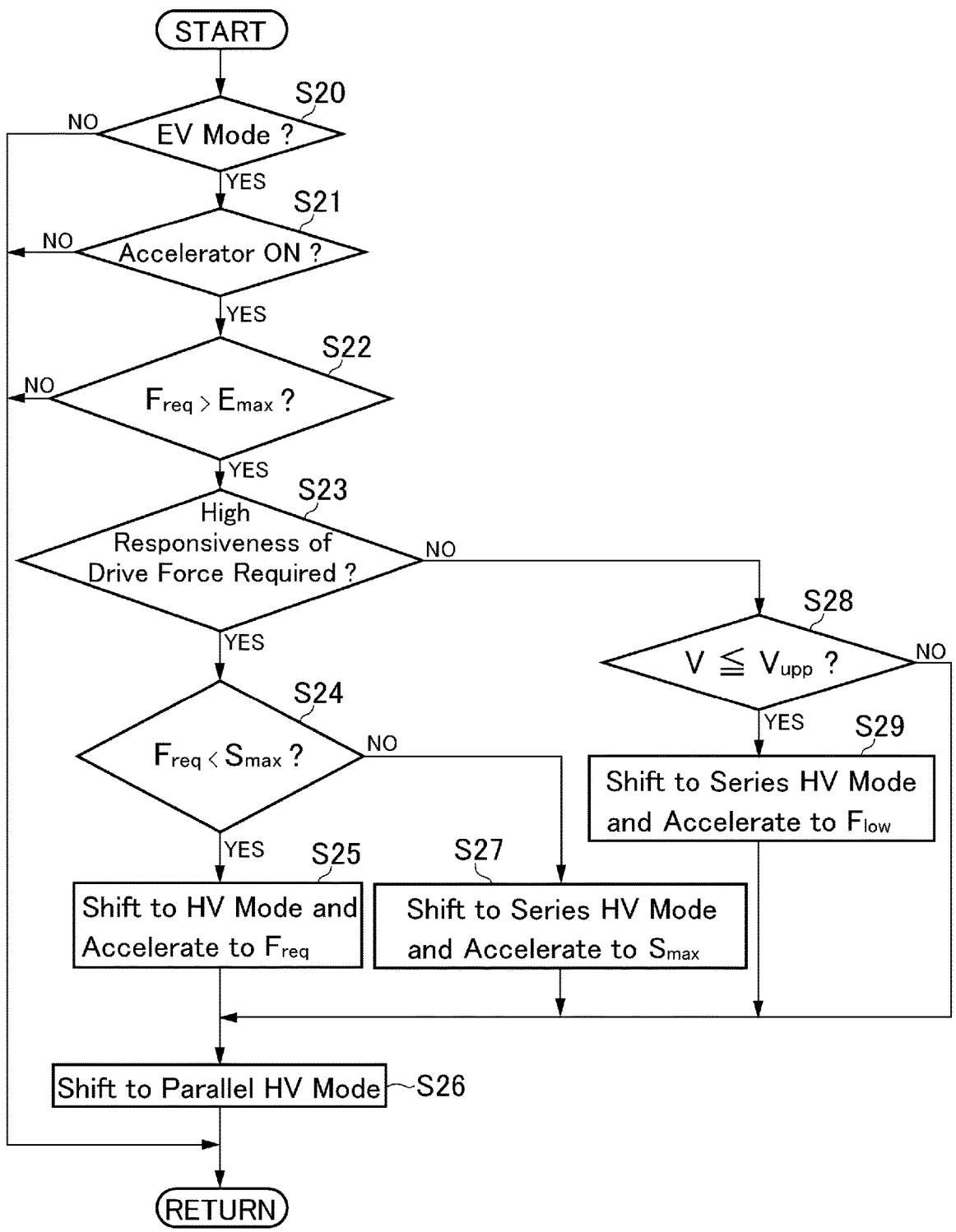
FIG. 4 is a flowchart illustrating another example of the control executed by the controller of the hybrid vehicle according to the disclosure (a control example taking account of responsiveness of a drive force required by a driver)

Turning to FIG. 4, there is shown another example of a routine to be executed when accelerating the vehicle Ve while shifting the running mode.

In the routine shown in FIG. 4, contents of steps S20, S21, and S22 are similar to steps S10, S11, and S12 in the routine shown in FIG. 2 respectively. In the routine shown in FIG. 4, if the required drive force $F_{req}$ is greater than the maximum EV drive force $E_{max}$ so that the answer in step S22 is YES, the routine proceeds to step S23.

At step S23, it is determined whether high responsiveness of the drive force is required. Specifically, definition of the "responsiveness of the drive force" is a response of acceleration with respect to an operation of the accelerator pedal executed by the driver. According to the embodiment of the present disclosure, the vehicle Ve is configured to enhance the acceleration response when the driver demands the high responsiveness for the drive force. When the high responsiveness of the drive force is required, the vehicle Ve is controlled such that the acceleration response is improved. For example, the vehicle Ve is controlled in such a manner that the running mode can be shifted with a shorter period of time than usual. For example, demand of the high responsiveness of the drive force may be determined based on an operation amount of the accelerator pedal 8 and a speed to operate the accelerator pedal 8. Specifically, demand of the high responsiveness of the drive force is determined when the accelerator pedal 8 is operated in a predetermined amount at a speed higher than a predetermined speed. For example, if the vehicle Ve is provided with a system for manually switching a driving mode, demand of the high responsiveness of the drive force is determined when the driving mode is switched from a normal mode to a sporty mode.

If the high responsiveness of the drive force is required so that the answer of this step S23 is YES, the routine proceeds to step S24.

At step S24, it is determined whether the required drive force $F_{req}$ is smaller than the maximum series HV drive force $S_{max}$. As described above, the required drive force $F_{req}$ is obtained based on an operating amount (i.e, a depression) of the accelerator pedal 8 and a vehicle speed. As also described, the maximum series HV drive force $S_{max}$ is the substantially largest drive force generatable in the series HV mode. In the map shown in FIG. 3, the maximum series HV drive force $S_{max}$ is set in such a manner as to be reduced with an increase in the vehicle speed, and is set in the region where both of the vehicle speed and the drive force exceed the maximum EV drive force $E_{max}$.

If the required drive force $F_{req}$ is smaller than the maximum series HV drive force $S_{max}$ so that the answer of this step S24 is YES, the routine proceeds to step S25.

At step S25, the running mode of the vehicle Ve is shifted from the EV mode to the series HV mode. Then, the vehicle Ve is accelerated until the actual drive force F of the vehicle Ve reaches the required drive force $F_{req}$. Specifically, first of all, the running mode is shifted from the EV mode to the series HV mode by starting the engine 1 while engaging the clutch 7. Then, the vehicle Ve is accelerated in the series HV mode until the actual drive force F reaches the required drive force $F_{req}$. The series HV mode is maintained until the actual drive force F reaches the required drive force $F_{req}$, even if the actual drive force F exceeds the required additional drive force $F_{low}$ before achieving the required drive force $F_{req}$.

Then, when the actual drive force F reaches the required drive force $F_{req}$, the routine proceeds to step S26 and the running mode of the vehicle Ve is shifted from the series HV mode to the parallel HV mode. Specifically, the vehicle Ve is accelerated in the series HV running mode until the actual drive force F reaches the required drive force $F_{req}$ on the map shown in FIG. 3. Then, when the actual drive force F reaches the required drive force $F_{req}$, the running mode is switched to the parallel HV mode. Specifically, the running mode is shifted from the series HV mode to the parallel HV mode by engaging the clutch 7 in a state where the engine 1 is operated and the first motor 2 is operated as a generator.

In the case that the high responsiveness of the drive force is required during accelerating the vehicle Ve, at step S25 and step S26, the series HV mode is maintained until the actual drive force F reaches the required drive force $F_{req}$, even if the actual drive force F reaches the required additional drive force $F_{low}$ first. Thus, the vehicle Ve is accelerated in the series HV mode until the actual drive force F reaches the required drive force $F_{req}$. The running mode is switched to the parallel HV mode in advance after the actual drive force F reaches the required drive force $F_{req}$.

In the running region where the drive force does not exceeds the maximum EV drive force $E_{max}$, the acceleration response of the vehicle Ve is higher in the EV mode that the parallel HV mode. In the running region where the drive force does not exceeds the maximum series HV drive force $S_{max}$, the acceleration response of the vehicle Ve is higher in the series HV mode than the parallel HV mode.

Therefore, when the high responsiveness of the drive force is required, the vehicle Ve is accelerated in the series HV mode in which the acceleration response is higher until the actual drive force F reaches the required drive force $F_{req}$, even if the actual drive force F exceeds the required additional drive force $F_{low}$, as described above. For this reason, the vehicle Ve can be accelerated with a good response and the running mode can be shifted to the parallel HV mode without delay. Thus, acceleration response can be enhanced and the running mode can be shifted smoothly.

If the required drive force $F_{req}$ is equal to or greater than the maximum series HV drive force $S_{max}$ so that the answer of step S24 is NO, the routine proceeds to step S27.

At step S27, the running mode of the vehicle Ve is switched from the EV mode to the series HV mode. Then, the vehicle Ve is accelerated to achieve the required drive force $F_{req}$, until the actual drive force F of the vehicle Ve reaches the maximum series HV drive force $S_{max}$. Specifically, the engine 1 is started in a state where the clutch 7 is disengaged to shift the running mode from the EV mode to the series HV mode. The vehicle Ve is accelerated in the series HV mode until the actual drive force F reaches the maximum series HV drive force $S_{max}$. The series HV mode is maintained until the actual drive force F reaches the maximum series HV drive force $S_{max}$ even if the actual drive force F exceeds the required additional drive force $F_{low}$ before reaching the maximum series HV drive force $S_{max}$.

Then, when the actual drive force F exceeds the maximum series HV drive force $S_{max}$, the routine proceeds to step S26, and the running mode of the vehicle Ve is switched from the series HV mode to the parallel HV mode. Specifically, the vehicle Ve is accelerated in the series HV mode until the actual drive force F reaches the maximum series HV drive force $S_{max}$ in the map shown in FIG. 3. When the actual drive force F exceeds the maximum series HV drive force $S_{max}$, the running mode is switched to the parallel HV mode. Specifically, the running mode is shifted from the series HV mode to the parallel HV mode by engaging the clutch 7 in a state where the engine 1 has already been started and the first motor 2 has already started to generate electricity.

In the case that the high responsiveness of the drive force is required during accelerating the vehicle Ve, at step S26 and step S27, the series HV mode is maintained until the actual drive force F reaches the maximum series HV drive force $S_{max}$ even if the actual drive force F reaches the required additional drive force $F_{low}$ first. Thus, the vehicle Ve is accelerated in the series HV mode until the actual drive force F reaches the maximum series HV drive force $S_{max}$. The running mode is switched to the parallel HV mode when the actual drive force F reaches the maximum series HV drive force $S_{max}$.

Therefore, when the high responsiveness of the drive force is required, the vehicle Ve is accelerated in the series HV mode in which the acceleration response is higher until the actual drive force F reaches the maximum series HV drive force $S_{max}$, even if the actual drive force F exceeds the required additional drive force $F_{low}$, as described above. For this reason, the vehicle Ve can be accelerated with a good response.

By contrast, if the high responsiveness of the drive force is not required so that the answer in step S23 is NO, the routine proceeds to step S28 to determine whether the vehicle speed V is equal to or lower than the upper limit vehicle speed $V_{upp}$. If the vehicle speed V is equal to or lower than the upper limit vehicle speed $V_{upp}$ so that the answer in step S28 is YES, the routine proceeds to step S29 and step S26. Otherwise, if the vehicle speed V is higher than the upper limit vehicle speed $V_{upp}$ so that the answer in step S28 is NO, the routine skips step S29 and proceeds to step S26. The control contents of steps S28, S29, and S26 in the routine shown in FIG. 4 are respectively similar to those of steps S13, S14, and S15 in the routine shown in FIG. 2.

Thus, in the case that the high responsiveness of the drive force is not required when accelerating the vehicle Ve in the speed range where the required additional drive force $F_{low}$ is greater than the maximum series HV drive force $S_{max}$, the running mode is shifted immediately to the parallel HV mode via steps S28, S29, and S26, even if the required drive force $F_{req}$ is lower than the required additional drive force $F_{low}$. Therefore, the running mode can be shifted a lower vehicle speed V. As a result, the torque pulse and the acceleration fluctuation as well as the shift shock and the engagement shock of the clutch 7 can be reduced during accelerating the vehicle Ve while shifting the running mode. In addition, in the operating region in which the required additional drive force $F_{low}$ can only be achieved in the parallel HV mode, a response delay of acceleration as might otherwise be caused by engaging the clutch 7 to shift the running mode can be reduced by shifting the running mode to the parallel HV mode in advance.

Figure 5:
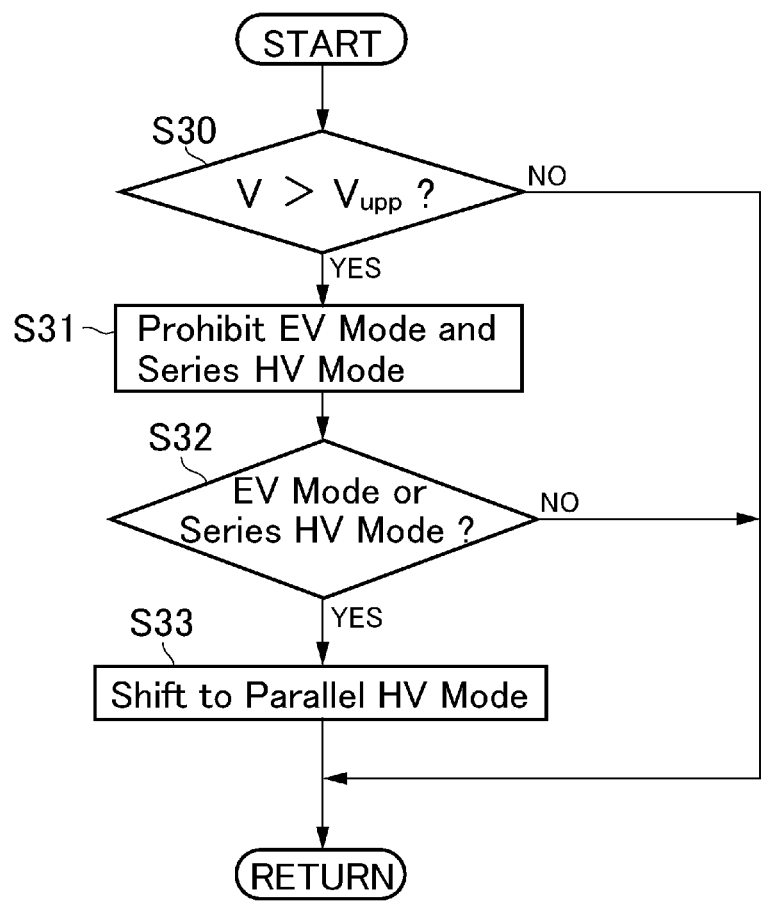
FIG. 5 is a flowchart illustrating still another example of the control executed by the controller of the hybrid vehicle according to the disclosure (a control example where the vehicle runs in a vehicle speed range with a required additional drive force exceeding a maximum series HV drive force)
Figure 6:
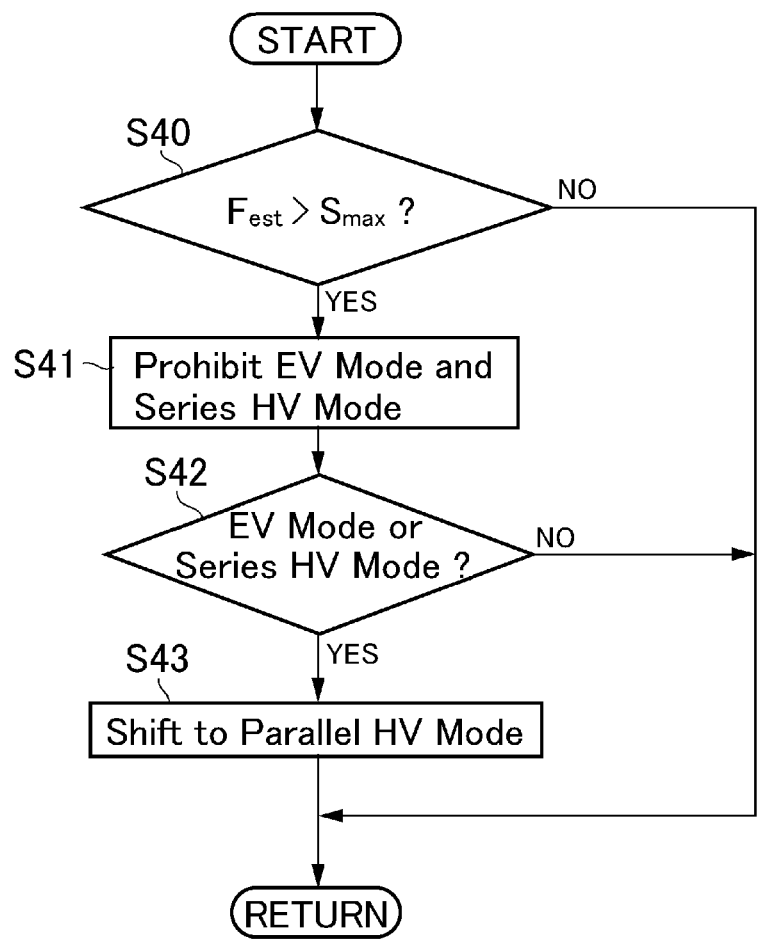
FIG. 6 is a flowchart illustrating another example of the control executed by the controller of the hybrid vehicle according to the disclosure (a control example taking account of an estimated required drive force (to-be-required drive force))

The controller 10 is further configured to execute routines shown in FIG. 5 and FIG. 6.

The routine shown in FIG. 5 is an example to execute step S13, S14, and S15 in the routine shown in FIG. 2, or steps S28, S29, and S26 in the routine shown in FIG. 4 in an independent flow.

In the routine shown in FIG. 5, at step S30, it is determined whether the current vehicle speed V is higher than the upper limit vehicle speed $V_{upp}$. As described above, the upper limit vehicle speed $V_{upp}$ is a speed of the vehicle Ve at which a required additional drive force $F_{low}$ and a maximum series HV drive force $S_{max}$ become equal to each other. In other words, the upper limit vehicle speed $V_{upp}$ is a speed of the vehicle Ve at an intersecting point between the maximum series HV drive force $S_{max}$ and the required additional drive force $F_{low}$ in the map shown in FIG. 3. Accordingly, in the speed range where the vehicle speed V is higher than the upper limit vehicle speed $V_{upp}$, the maximum series HV drive force $S_{max}$ is always lower than the required additional drive force $F_{low}$.

If the vehicle speed V is equal to or lower than the upper limit vehicle speed $V_{upp}$ so that the answer of step S30 is NO, the routine returns. If the vehicle speed V is higher than the upper limit vehicle speed $V_{upp}$ so that the answer of step S30 is YES, the routine proceeds to step S31.

At step S31, the EV mode and the series HV mode are prohibited. In other words, the running mode of the vehicle Ve cannot be shifted to the EV mode or the series HV mode. In this situation, the vehicle Ve is propelled at a speed higher than the upper limit vehicle speed $V_{upp}$. When accelerating the vehicle Ve in such speed range while shifting the running mode, the running mode is shifted in the operating region lower than the required additional drive force $F_{low}$.

As described above, in the case of shifting the running mode in the operating region lower than the required additional drive force $F_{low}$, it is advantageous to shift the running mode at a lower vehicle speed V. Otherwise, in the operating region lower than the required additional drive force $F_{low}$, the shift shock and the engagement shock of the clutch 7 due to the mode shift and the resultant acceleration response delay, as well as the torque pulse and the acceleration fluctuation due to startup of the engine 1 can be reduced if the running mode is not shifted. At step S31, therefore, shifting of the running mode to the EV mode and the series HV which requires to start the engine 1 and to engage the clutch 7 to be shifted to the parallel HV mode is prohibited. Consequently, the vehicle Ve is propelled only in the parallel HV mode so that an occurrence of the engagement shock of the clutch 7, the response delay of acceleration, the acceleration fluctuation etc. are prevented.

Then, it is determined at step S32 whether the vehicle Ve is propelled in the EV mode or the series HV mode. If the vehicle Ve is not propelled in the EV mode or the series HV mode, that is, if the vehicle Ve is propelled in the parallel HV mode so that the answer of step S32 is NO, the routine returns. By contrast, if the vehicle Ve is running in the EV mode or the series HV mode so that the answer of step S32 is YES, the routine proceeds to step S33.

At step S33, the running mode of the vehicle Ve is shifted from the EV mode or the series HV mode to the parallel HV mode. Specifically, the running mode is shifted from the EV mode to the parallel HV mode by starting the engine 1 to operate the first motor 2 as a generator while engaging the clutch 7. Otherwise, the running mode is shifted from the series HV mode to the parallel HV mode by engaging the clutch 7 in a state where the engine 1 has already been started and the first motor 2 has already been operated as a generator.

As described above, in the case of shifting the running mode in the operating region lower than the required additional drive force $F_{low}$, it is advantageous to shift the running mode at a lower vehicle speed V. At step S33, therefore, the running mode is shifted immediately to the parallel HV mode at a low speed. Consequently, an impact of the engagement shock and the acceleration fluctuation can be reduced. In addition, since the running mode is shifted to the parallel HV mode in advance, it is possible to reduce the response delay of acceleration due to engagement of the clutch 7 when the driver intends to accelerate the vehicle Ve.

After shifting the running mode of the vehicle Ve to the parallel HV mode at step S33, the routine returns.

FIG. 6 shows a modification example of the routine shown in FIG. 5. In the routine shown in FIG. 6, the running mode is shifted based on the estimated required drive force $F_{est}$ as an estimated value of the drive force required in future to accelerate the vehicle Ve. For example, the estimated required drive force $F_{est}$ can be estimated based on data such as a travel history of the vehicle Ve stored in the controller 10, a road surface condition acquired from the navigation system 9i, the external data transmission/reception system 9j, and so on. Specifically, the estimated required drive force $F_{est}$ is obtained based on a history of the actual drive force F and a history of the speed of the accelerator operation stored by the controller 10, as well as the road surface condition detected by the navigation system 9i and the external data transmission/reception system 9j.

Figure 7:
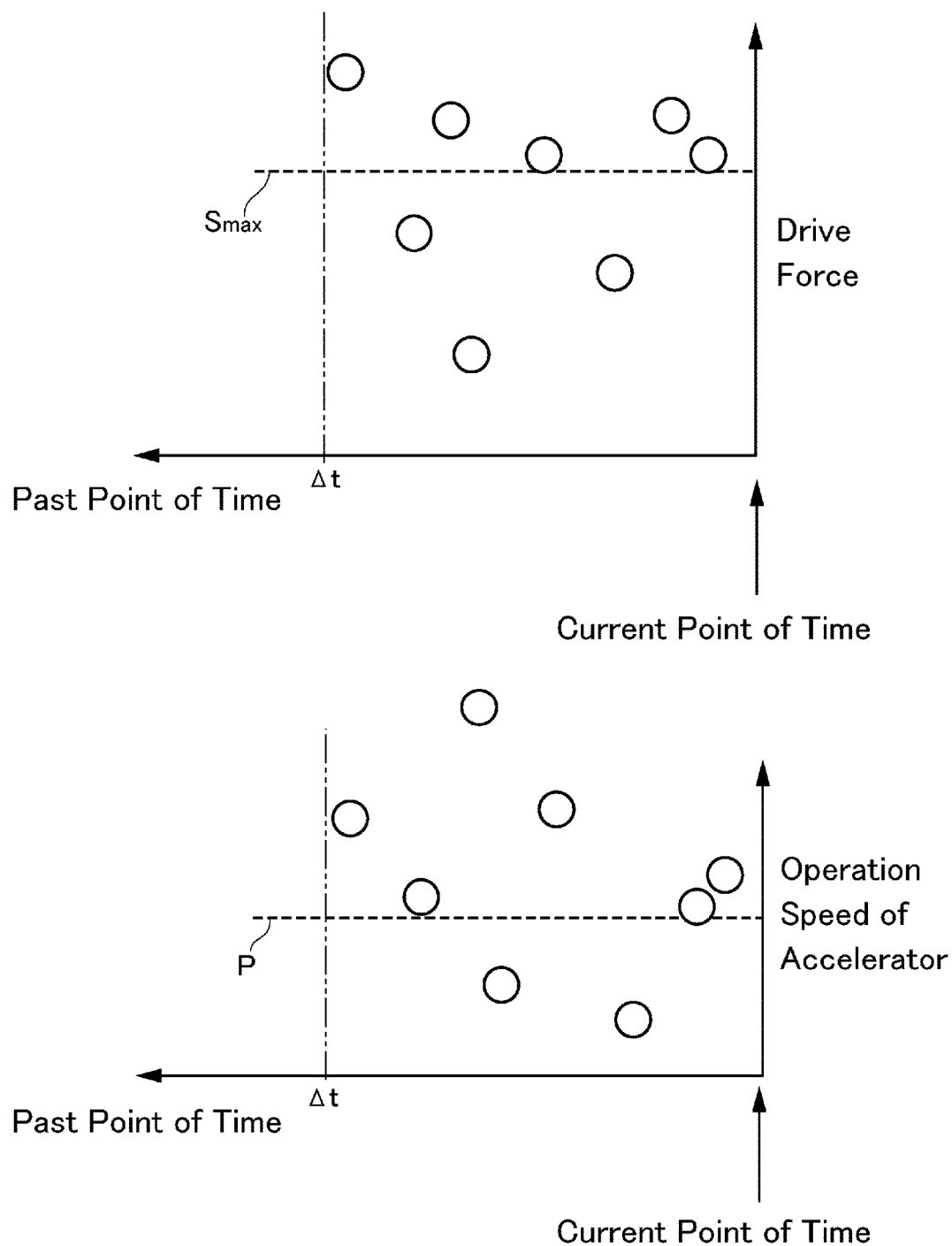
FIG. 7 is a time chart illustrating an example of a method of estimating the "estimated required drive force" used for executing the control illustrated in the flowchart in FIG. 6.

In the routine shown in FIG. 6, at step S40, it is determined whether the estimated required drive force $F_{est}$ is greater than the maximum series HV drive force $S_{max}$. As described above, the estimated required drive force $F_{est}$ is an estimated value of the required drive force to accelerate the vehicle Ve. For example, the controller 10 determines that the estimated required drive force $F_{est}$ is greater than the maximum series HV drive force $S_{max}$ given that: (1) a frequency of the actual drive force F to exceed the maximum series HV drive force $S_{max}$; and (2) a frequency of the operation speed of the accelerator pedal 8 to generate the actual drive force F exceeds a determination threshold P, within a past period of time from a current point of time to a predetermined point of time Δt shown in the time chart of FIG. 7, are respectively greater than a predetermined value.

For example, when the vehicle Ve makes a turn at a corner of a road or in a winding road, a required or expected acceleration of the vehicle Ve (expected acceleration) at an exit of the corner can be estimated based on a deceleration of the vehicle Ve from an entrance of the corner. The estimated required drive force $F_{est}$ may also be obtained based on the expected acceleration to achieve the expected acceleration.

If the estimated required drive force $F_{est}$ estimated by the above-explained procedures is greater than the maximum series HV drive force $S_{max}$, the running mode is expected to be shifted to the parallel HV mode in the near future. By contrast, if the estimated required drive force $F_{est}$ is smaller than the maximum series HV drive force $S_{max}$, it is expected that the vehicle Ve will not be accelerated while shifting the running mode to the parallel HV mode.

If the estimated required drive force $F_{est}$ is equal to or smaller than the maximum series HV drive force $S_{max}$ so that the answer of this step S40 is NO, the routine returns. By contrast, if the estimated required drive force $F_{est}$ is greater than the maximum series HV drive force $S_{max}$ so that the answer of step S40 is YES, the routine proceeds to step S41.

At step S41, the EV mode and the series HV mode are prohibited. In other words, the running mode of the vehicle Ve cannot be shifted to the EV mode or the series HV mode. In this situation, the running mode is expected to be shifted to the parallel HV mode in the near future. As described above, it is advantageous to shift the running mode at a lower vehicle speed V. Otherwise, the shift shock and the engagement shock of the clutch 7 due to the mode shift and the resultant acceleration response delay, as well as the torque pulse and the acceleration fluctuation due to startup of the engine 1 can be reduced if the running mode is not shifted. In addition, shifting of the running mode during accelerating the vehicle Ve can be prevented by shifting the running mode switched to the parallel HV mode in advance. Consequently, it is possible to reduce an impact of the shift shock and the engagement shock of the clutch 7 due to the shifting of the running mode, the resultant delay in the acceleration response, the torque pulse and the acceleration fluctuation during startup of the engine 1, and the like.

At step S41, therefore, shifting of the running mode to the EV mode and the series HV which requires to start the engine 1 and to engage the clutch 7 to be shifted to the parallel HV mode is prohibited. Consequently, the vehicle Ve is propelled only in the parallel HV mode so that an occurrence of the engagement shock of the clutch 7, the response delay of acceleration, the acceleration fluctuation etc. are prevented.

Then, it is determined at step S42 whether the vehicle Ve is propelled in the EV mode or the series HV mode. If the vehicle Ve is not propelled in the EV mode or the series HV mode, that is, if the vehicle Ve is propelled in the parallel HV mode so that the answer of step S42 is NO, the routine returns. By contrast, if the vehicle Ve is propelled in the EV mode or the series HV mode so that the answer of step S42 is YES, the routine proceeds to step S43.

At step S43, the running mode of the vehicle Ve is shifted from the EV mode or the series HV mode to the parallel HV mode. Specifically, the running mode is shifted from the EV mode to the parallel HV mode by starting the engine 1 to operate the first motor 2 as a generator while engaging the clutch 7. Otherwise, the running mode is shifted from the series HV mode to the parallel HV mode by engaging the clutch 7 in a state where the engine 1 has already been started and the first motor 2 has already been operated as a generator.

As described above, it is advantageous to shift the running mode at a lower vehicle speed V. At step S43, therefore, the running mode is shifted immediately to the parallel HV mode at a low speed. Consequently, an impact of the engagement shock and the acceleration fluctuation can be reduced. In addition, since the running mode is shifted to the parallel HV mode in advance, it is possible to reduce the response delay of acceleration due to engagement of the clutch 7 when the driver intends to accelerate the vehicle Ve.

After shifting the running mode of the vehicle Ve to the parallel HV mode at step S43, the routine returns.

As described above, the vehicle Ve according to the embodiment of the present disclosure uses a multi-stage transmission with 8, 10 or more stages as the transmission 6 for example. Such a multi-speed automatic transmission involves a larger number of elements in a clutch mechanism to be engaged or disengaged for setting each gear stage and a neutral stage, compared with a general conventional automatic transmission with five or six stages for example. A larger number of the elements of the clutch mechanism leads to more complex control required for the clutch mechanism, when the clutch mechanism is disengaged to set the neutral stage or is engaged to put the transmission 6 in a power transmission state for the running mode shifting, control for the clutch mechanism, and also leads to a longer time required for the engagement and the disengagement of the clutch mechanism. Thus, the multi-stage automatic transmission with 8 or 10 stages described above is disadvantageous in terms of reduction of the switching time and reduction of the engagement shock due to shifting of the running mode. In the vehicle Ve according to the embodiment of the present disclosure, the shift shock of the transmission 6 and the engagement shock of the clutch 7 can be reduced during acceleration involving shifting of the running mode. Thus, the vehicle Ve according to the embodiment of the present disclosure can have the multi-speed automatic transmission with 8 or 10 stages installed and can still be accelerated with the running mode appropriately switched without making the driver feel uncomfortable or feel a sense of slowness.

What is claimed is:

1. A control system for a hybrid vehicle, the control system comprising:
   a prime mover including an engine, a first motor, and a second motor;
   drive wheels that are driven by power from the prime mover to generate drive force;
   a clutch that selectively transmits power and interrupts power transmission between the engine and the drive wheels; and
   a controller that controls each of the engine, the first motor, the second motor, and the clutch, wherein:
   (A) the first motor is disposed to an output side of the engine and generates electricity when driven at least by the torque of the engine;
   (B) the second motor is connected to the drive wheels in a power transmittable manner;
   (C) a running mode of the hybrid vehicle is selected from:
   (C1) an electric vehicle mode in which the drive force is generated by torque generated by the second motor while stopping the engine;
   (C2) a parallel hybrid vehicle mode in which the engine is operated while engaging the clutch, and the drive force is generated by torques generated by the engine and the second motor; and
   (C3) a series hybrid vehicle mode in which the engine is operated while disengaging the clutch, the first motor is driven by the torque of the engine to generate electricity, and the drive force is generated by the torque generated by the second motor;
   (D) a maximum drive force generatable in the electric vehicle mode is set as a line indicating a value that decreases with an increase in vehicle speed on a running mode shifting map represented by a Cartesian coordinate system defined by coordinate axes representing the vehicle speed and the drive force;
   (E) a maximum drive force generatable in the series hybrid vehicle mode is set as a line indicating a value that is larger than the maximum drive force generatable in the electric vehicle mode and decreases with an increase in the vehicle speed on the running mode shifting map;
   (F) a required additional drive force is set as a line indicating a value that increases with an increase in the vehicle speed on the running mode shifting map;
   (G) the controller is configured to shift the running mode from the electric vehicle mode to the parallel hybrid vehicle mode by starting the engine and engaging the clutch while an actual drive force is less than the maximum drive force generatable in the series hybrid vehicle mode in a case of accelerating the hybrid vehicle in the electric vehicle mode, if (G1) a required drive force is greater than the maximum drive force generatable in the electric vehicle mode, (G2) the required drive force is greater than the required additional drive force as a variable corresponding to a running resistance against the hybrid vehicle running on a road at a predetermined vehicle speed by a predetermined drive force that is set in advance based on the vehicle speed and the drive force, and (G3) when the vehicle speed enters a speed region in which the required additional drive force is higher than the maximum drive force generatable in the series hybrid vehicle mode; and (H) the controller maintains the running mode in the electric vehicle mode if the required drive force is not greater than the maximum drive force generatable in the electric vehicle mode and the vehicle speed enters the speed region in which the required additional drive force is higher than the maximum drive force generatable in the series hybrid vehicle mode.

2. The control system as claimed in claim 1, further comprising:
 a detector that detects or calculates an operation amount and an operation speed of an accelerator, and the actual drive force;
 wherein the controller is further configured to:
 (i) obtain the required drive force based on the vehicle speed and the operation amount of the accelerator;
 (ii) determine whether a driver requires high responsiveness of the drive force based on the operation amount of the accelerator and the operation speed of the accelerator; and
 (iii) shift the running mode to the parallel hybrid vehicle mode when the actual drive force reaches the required drive force, in a case that the driver requires the high responsiveness of the drive force.

3. The control system as claimed in claim 2, wherein the controller is further configured to shift the running mode to the parallel hybrid vehicle mode when the actual drive force reaches the maximum drive force generatable in the series hybrid vehicle mode, in a case that the driver requires the high responsiveness of the drive force, and that the required drive force is equal to or greater than the maximum drive force generatable in the series hybrid vehicle mode.

4. The control system as claimed in claim 2, wherein the controller is further configured to shift the running mode to the parallel hybrid vehicle mode when the actual drive force reaches the required drive force, in a case that the driver requires the high responsiveness of the drive force, and that the required drive force is smaller than the maximum drive force generatable in the series hybrid vehicle mode.

5. The control system as claimed in claim 1, further comprising:
 a detector that detects or calculates an operation amount and an operation speed of an accelerator, and the actual drive force;
 wherein the controller is further configured to:
 (i) determine whether a driver requires high responsiveness of the drive force based on the operation amount of the accelerator and the operation speed of the accelerator, and
 (ii) shift the running mode to the parallel hybrid vehicle mode when the actual drive force exceeds the required additional drive force, in a case that the driver does not require the high responsiveness of the drive force.

6. A control system for a hybrid vehicle, the control system comprising:
 a prime mover including an engine and a motor;
 drive wheels that are driven by power from the prime mover to generate drive force;
 a clutch that selectively transmits power and interrupts power transmission between the engine and the drive wheels;
 a detector that detects or calculates an operation amount and an operation speed of an accelerator, and an actual drive force; and
 a controller that controls each of the engine, the motor, and the clutch, wherein:
 (A) a running mode of the hybrid vehicle is selected from:
 (A1) an electric vehicle mode in which the drive force is generated by torque generated by the motor while stopping the engine, and
 (A2) a parallel hybrid vehicle mode in which the engine is operated while engaging the clutch, and the drive force is generated by torques generated by the engine and the motor;
 (B) a maximum drive force generatable in the electric vehicle mode is set as a line indicating a value that decreases with an increase in vehicle speed on a running mode shifting map represented by a Cartesian coordinate system defined by coordinate axes representing the vehicle speed and the drive force; and
 (C) the controller is configured to shift the running mode from the electric vehicle mode to the parallel hybrid vehicle mode by starting the engine and engaging the clutch while an actual drive force is less than the maximum drive force generatable in the electric vehicle mode in a case of accelerating the hybrid vehicle in the electric vehicle mode, if (C1) a required drive force is greater than the maximum drive force generatable in the electric vehicle mode, (C2) the required drive force is greater than a required additional drive force as a variable corresponding to a running resistance against the hybrid vehicle running on a road at a predetermined vehicle speed by a predetermined drive force that is set in advance based on the vehicle speed and the drive force, and (C3) when the actual drive force becomes greater than the required additional drive force.

7. A control system for a hybrid vehicle, the control system comprising:
 a prime mover including an engine and a motor;
 drive wheels that are driven by power from the prime mover to generate drive force;
 a clutch that selectively transmits power and interrupts power transmission between the engine and the drive wheels;
 a detector that detects or calculates an operation amount and an operation speed of an accelerator, and an actual drive force, the detector also including a device that detects or estimates a road condition; and
 a controller that controls each of the engine, the motor, and the clutch, wherein:
 (A) a running mode of the hybrid vehicle is selected from:
 (A1) an electric vehicle mode in which the drive force is generated by torque generated by the motor while stopping the engine, and
 (A2) a parallel hybrid vehicle mode in which the engine is operated while engaging the clutch, and the drive force is generated by torques generated by the engine and the motor;
 (B) a maximum drive force generatable in the electric vehicle mode is set as a line indicating a value that decreases with an increase in vehicle speed on a running mode shifting map represented by a Cartesian coordinate system defined by coordinate axes representing the vehicle speed and the drive force; and
 (C) the controller is configured to shift the running mode from the electric vehicle mode to the parallel hybrid vehicle mode by starting the engine and engaging the clutch while an actual drive force is less than the maximum drive force generatable in the electric vehicle mode in a case of accelerating the hybrid vehicle in the electric vehicle mode, if (C1) a required drive force is greater than the maximum drive force generatable in the electric vehicle mode, (C2) the required drive force is greater than a required additional drive force as a variable corresponding to a running resistance against the hybrid vehicle running on a road at a predetermined vehicle speed by a predetermined drive force that is set in advance based on the vehicle speed and the drive force, and (C3) when the actual drive force becomes greater than the required additional drive force.

8. A control system for a hybrid vehicle, the control system comprising:
   a prime mover including an engine, a first motor, and a second motor;
   drive wheels that are driven by power from the prime mover to generate drive force;
   a clutch that selectively transmits power and interrupts power transmission between the engine and the drive wheels; and
   a controller that controls each of the engine, the first motor, the second motor, and the clutch, wherein:
   (A) the first motor is disposed to an output side of the engine and generates electricity when driven at least by the torque of the engine;
   (B) the second motor is connected to the drive wheels in a power transmittable manner;
   (C) a running mode of the hybrid vehicle is selected from:
   (C1) an electric vehicle mode in which the drive force is generated by torque generated by the second motor while stopping the engine;
   (C2) a parallel hybrid vehicle mode in which the engine is operated while engaging the clutch, and the drive force is generated by torques generated by the engine and the second motor; and
   (C3) a series hybrid vehicle mode in which the engine is operated while disengaging the clutch, the first motor is driven by the torque of the engine to generate electricity, and the drive force is generated by the torque generated by the second motor;
   (D) a maximum drive force generatable in the electric vehicle mode is set as a line indicating a value that decreases with an increase in vehicle speed on a running mode shifting map represented by a Cartesian coordinate system defined by coordinate axes representing the vehicle speed and the drive force;
   (E) a maximum drive force generatable in the series hybrid vehicle mode is set as a line indicating a value that is larger than the maximum drive force generatable in the electric vehicle mode and decreases with an increase in the vehicle speed on the running mode shifting map;
   (F) a required additional drive force is set as a line indicating a value that increases with an increase in the vehicle speed on the running mode shifting map;
   (G) an upper limit vehicle speed at which the maximum drive force generatable in the series hybrid vehicle mode and the required additional drive force become equal to each other is set on the running mode shifting map;
   (H) the controller is configured to shift the running mode from the electric vehicle mode to the parallel hybrid vehicle mode by starting the engine and engaging the clutch while an actual drive force is less than the maximum drive force generatable in the series hybrid vehicle mode in a case of accelerating the hybrid vehicle in the electric vehicle mode, if (H1) a required drive force is greater than the maximum drive force generatable in the electric vehicle mode, (H2) the required drive force is greater than the required additional drive force as a variable corresponding to a running resistance against the hybrid vehicle running on a road at a predetermined vehicle speed by a predetermined drive force that is set in advance based on the vehicle speed and the drive force, and (H3) when the vehicle speed exceeds the upper limit vehicle speed on the running mode shifting map; and
   (I) the controller maintains the running mode in the electric vehicle mode if the required drive force is not greater than the maximum drive force generatable in the electric vehicle mode and the vehicle speed exceeds the upper limit vehicle speed on the running mode shifting map.

9. The control system as claimed in claim 8, further comprising:
   a detector that detects or calculates an operation amount and an operation speed of an accelerator, and the actual drive force;
   wherein the controller is further configured to:
   (i) obtain the required drive force based on the vehicle speed and the operation amount of the accelerator,
   (ii) determine whether a driver requires high responsiveness of the drive force based on the operation amount of the accelerator and the operation speed of the accelerator, and
   (iii) shift the running mode to the parallel hybrid vehicle mode when the actual drive force reaches the required drive force, in a case that the driver requires the high responsiveness of the drive force.

10. The control system as claimed in claim 9, wherein the controller is further configured to shift the running mode to the parallel hybrid vehicle mode when the actual drive force reaches the maximum drive force generatable in the series hybrid vehicle mode, in a case that the driver requires the high responsiveness of the drive force, and that the required drive force is equal to or greater than the maximum drive force generatable in the series hybrid vehicle mode.

11. The control system as claimed in claim 9, wherein the controller is further configured to shift the running mode to the parallel hybrid vehicle mode when the actual drive force reaches the required drive force, in a case that the driver requires the high responsiveness of the drive force, and that the required drive force is smaller than the maximum drive force generatable in the series hybrid vehicle mode.

12. The control system as claimed in claim 8, further comprising:
   a detector that detects or calculates an operation amount and an operation speed of an accelerator, and the actual drive force;
   wherein the controller is further configured to:
   (i) determine whether a driver requires high responsiveness of the drive force based on the operation amount of the accelerator and the operation speed of the accelerator, and
   (ii) shift the running mode to the parallel hybrid vehicle mode when the actual drive force exceeds the required additional drive force, in a case that the driver does not require the high responsiveness of the drive force.

* * * * *